US 6,671,797 B1

(12) United States Patent
Golston

(10) Patent No.: US 6,671,797 B1
(45) Date of Patent: Dec. 30, 2003

(54) MICROPROCESSOR WITH EXPAND INSTRUCTION FOR FORMING A MASK FROM ONE BIT

(75) Inventor: Jeremiah E. Golston, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 604 days.

(21) Appl. No.: 09/702,463

(22) Filed: Oct. 31, 2000

Related U.S. Application Data

(60) Provisional application No. 60/183,527, filed on Feb. 18, 2000.

(51) Int. Cl.[7] .......................... G06F 9/315; G06F 9/305
(52) U.S. Cl. .................. 712/224; 712/223; 712/213; 712/219; 712/214; 712/300
(58) Field of Search .................. 712/222, 214, 712/224, 300, 223, 213, 219; 345/501, 503

(56) References Cited

U.S. PATENT DOCUMENTS 5,640,578 A    6/1997  Balmer et al. .............. 395/562
5,765,216 A  * 6/1998  Weng et al. ................. 712/214
6,049,865 A  * 4/2000  Smith ......................... 712/222
6,100,905 A  * 8/2000  Sidwell ....................... 345/501

* cited by examiner

Primary Examiner—Daniel H. Pan
(74) Attorney, Agent, or Firm—Robert D. Marshall, Jr.; W. James Brady, III; Frederick J. Telecky, Jr.

(57) ABSTRACT

A data processing system is provided with a digital signal processor which has an instruction for expanding one bit to form a mask field. In one form of the instruction, a first bit from a two-bit mask in a source operand is replicated and placed in an least significant half word of a destination operand while a second bit from the two-bit mask in the source operand is replicated and placed in a most significant half word of the destination operand. In another form of the instruction, a first bit from a four bit mask in a source operand is replicated and placed in a least significant byte of a destination operand, a second bit from the four-bit mask in the source operand is replicated and placed in a second least significant byte of the destination operand, a third bit from the four-bit mask is replicated and placed in a second most significant byte of the destination operand and a fourth bit form the four-bit mask is replicated and placed in a most significant byte of the destination operand.

14 Claims, 8 Drawing Sheets

FIG. 3A

OPERATIONS ON THE .L UNIT

| 31 | 29 28 27 | 23 22 | 18 17 | 13 12 11 | 5 4 3 2 1 0 |
|---|---|---|---|---|---|
| CREG | Z | DST | SCR2 | SRC1/CST | X | OP | 1 | 1 | 0 | S | P |
| 3 | | 5 | 5 | 5 | | 7 | |

FIG. 3B

OPERATIONS ON THE .M UNIT

| 31 | 29 28 27 | 23 22 | 18 17 | 13 12 11 | 7 6 5 4 3 2 1 0 |
|---|---|---|---|---|---|
| CREG | Z | DST | SCR2 | SRC1/CST | X | OP | 0 | 0 | 0 | 0 | S | P |
| 3 | | 5 | 5 | 5 | | 5 | |

FIG. 3C

OPERATIONS ON THE .D UNIT

| 31 | 29 28 27 | 23 22 | 18 17 | 13 12 | 7 6 5 4 3 2 1 0 |
|---|---|---|---|---|---|
| CREG | Z | DST | SCR2 | SRC1/CST | OP | 1 | 0 | 0 | 0 | S | P |
| 3 | | 5 | 5 | 5 | 6 | |

FIG. 3D

LOAD/STORE WITH 15-BIT OFFSET (ON THE .D UNIT)

| 31 | 29 28 27 | 23 22 | 8 7 6 4 3 2 1 0 |
|---|---|---|---|
| CREG | Z | DST/SRC | UCST15 | Y | LD/ST | 1 | 1 | S | P |
| 3 | | 5 | 15 | | 3 | |

FIG. 3E

LOAD/STORE 'BASER' + 'OFFSETR/CST' ON THE .D UNIT

| 31 | 29 28 27 | 23 22 | 18 17 | 13 12 | 9 8 7 6 4 3 2 1 0 |
|---|---|---|---|---|---|
| CREG | Z | DST/SRC | BASE R | OFFSET R/UCST5 | MODE | R | Y | LD/ST | 0 | 1 | S | P |
| 3 | | 5 | 5 | 5 | 4 | | 3 | |

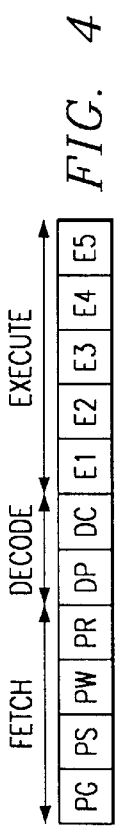

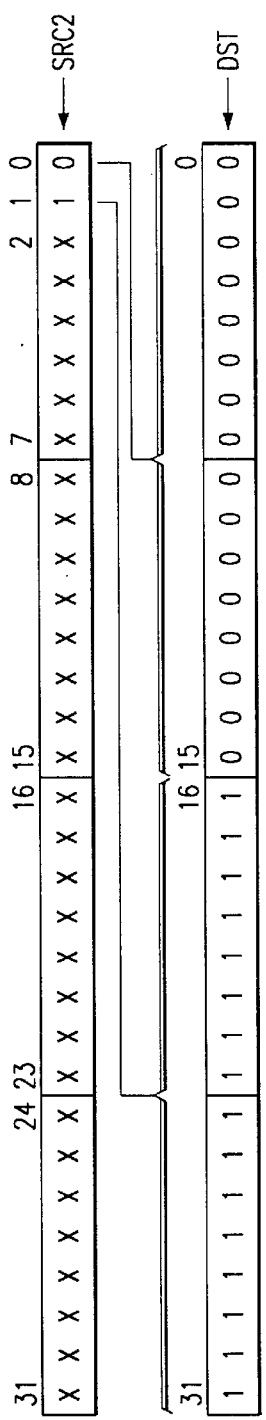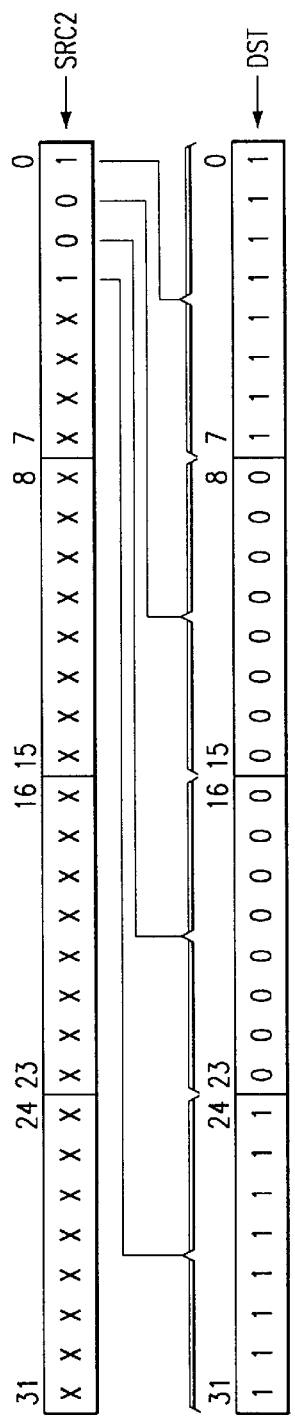

US 6,671,797 B1

MICROPROCESSOR WITH EXPAND INSTRUCTION FOR FORMING A MASK FROM ONE BIT

This application claims priority under 35 USC §119(e)(1) of U.S. Provisional Application No. 60/183,527, filed Feb. 18, 2000 (TI-30302PS)

NOTICE (C) Copyright 2000 Texas Instruments Incorporated. A portion of the disclosure of this patent document contains material which is subject to copyright protection. The copyright owner has no objection to the facsimile reproduction by anyone of the patent disclosure, as it appears in the Patent and Trademark Office patent file or records, but otherwise reserves all copyright rights whatsoever.

TECHNICAL FIELD OF THE INVENTION

This invention relates to data processing devices, electronic processing and control systems and methods of their manufacture and operation, and particularly relates to microprocessors optimized for digital signal processing.

BACKGROUND OF THE INVENTION

Generally, a microprocessor is a circuit that combines the instruction-handling, arithmetic, and logical operations of a computer on a single semiconductor integrated circuit. Microprocessors can be grouped into two general classes, namely general-purpose microprocessors and special-purpose microprocessors. General-purpose microprocessors are designed to be programmable by the user to perform any of a wide range of tasks, and are therefore often used as the central processing unit (CPU) in equipment such as personal computers. Special-purpose microprocessors, in contrast, are designed to provide performance improvement for specific predetermined arithmetic and logical functions for which the user intends to use the microprocessor. By knowing the primary function of the microprocessor, the designer can structure the microprocessor architecture in such a manner that the performance of the specific function by the special-purpose microprocessor greatly exceeds the performance of the same function by a general-purpose microprocessor regardless of the program implemented by the user.

One such function that can be performed by a special-purpose microprocessor at a greatly improved rate is digital signal processing. Digital signal processing generally involves the representation, transmission, and manipulation of signals, using numerical techniques and a type of special-purpose microprocessor known as a digital signal processor (DSP). Digital signal processing typically requires the manipulation of large volumes of data, and a digital signal processor is optimized to efficiently perform the intensive computation and memory access operations associated with this data manipulation. For example, computations for performing Fast Fourier Transforms (FFTs) and for implementing digital filters consist to a large degree of repetitive operations such as multiply-and-add and multiple-bit-shift. DSPs can be specifically adapted for these repetitive functions, and provide a substantial performance improvement over general-purpose microprocessors in, for example, real-time applications such as image and speech processing.

DSPs are central to the operation of many of today's electronic products, such as high-speed modems, high-density disk drives, digital cellular phones, complex automotive systems, and video-conferencing equipment. DSPs will enable a wide variety of other digital systems in the future, such as video-phones, network processing, natural speech interfaces, and ultra-high speed modems. The demands placed upon DSPs in these and other applications continue to grow as consumers seek increased performance from their digital products, and as the convergence of the communications, computer and consumer industries creates completely new digital products.

Microprocessor designers have increasingly endeavored to exploit parallelism to improve performance. One parallel architecture that has found application in some modern microprocessors utilizes multiple instruction fetch packets and multiple instruction execution packets with multiple functional units.

Digital systems designed on a single integrated circuit are referred to as an application specific integrated circuit (ASIC). MegaModules are being used in the design of ASICs to create complex digital systems a single chip. (MegaModule is a trademark of Texas Instruments Incorporated.) Types of MegaModules include SRAMs, FIFOs, register files, RAMs, ROMs, universal asynchronous receiver-transmitters (UARTs), programmable logic arrays and other such logic circuits. MegaModules are usually defined as integrated circuit modules of at least 500 gates in complexity and having a complex ASIC macro function. These MegaModules are predesigned and stored in an ASIC design library. The MegaModules can then be selected by a designer and placed within a certain area on a new IC chip.

Designers have succeeded in increasing the performance of DSPs, and microprocessors in general, by increasing clock speeds, by removing data processing bottlenecks in circuit architecture, by incorporating multiple execution units on a single processor circuit, and by developing optimizing compilers that schedule operations to be executed by the processor in an efficient manner. The increasing demands of technology and the marketplace make desirable even further structural and process improvements in processing devices, application systems and methods of operation and manufacture.

SUMMARY OF THE INVENTION

An illustrative embodiment of the present invention seeks to provide a microprocessor, and a method for operating a microprocessor that improves digital signal processing performance. Aspects of the invention are specified in the claims.

In an embodiment of the present invention, a digital signal processor is provided which has an instruction for expanding one bit to form a mask.

In an embodiment of the present invention, a first bit from a two-bit mask in a source operand is replicated and placed in a least significant half word of a destination operand while a second bit from the two-bit mask in the source operand is replicated and placed in a most significant half word of the destination operand.

In another embodiment of the invention, a first bit from a four-bit mask in a source operand is replicated and placed in a least significant byte of a destination operand, a second bit from the four-bit mask is replicated and placed in a second least significant byte of the destination operand, a third bit from the four-bit mask is replicated and placed in a second most significant byte of the destination operand and a fourth bit from the four-bit mask is replicated and placed in a most significant byte of the destination operand.

BRIEF DESCRIPTION OF THE DRAWINGS

Other features and advantages of the present invention will become apparent by reference to the following detailed description when considered in conjunction with the accompanying drawings, in which:

FIGS. 3A–3J show an opcode map for the DSP of FIG. 1;

FIG. 4 is a timing diagram illustrating instruction execution pipeline phase of the processor of FIG. 1;

FIG. 5A illustrates an instruction syntax for a two way expand instruction, XPND2, executable by, the processor of FIG. 1;

FIG. 5B illustrates the operation of the XPND2 instruction;

FIG. 6A illustrates an instruction syntax for a four way expand instruction, XPND4, executable by the processor of FIG. 1;

FIG. 6B illustrates the operation of the XPND4 instruction;

DETAILED DESCRIPTION OF EMBODIMENTS OF THE INVENTION

Figure 1:
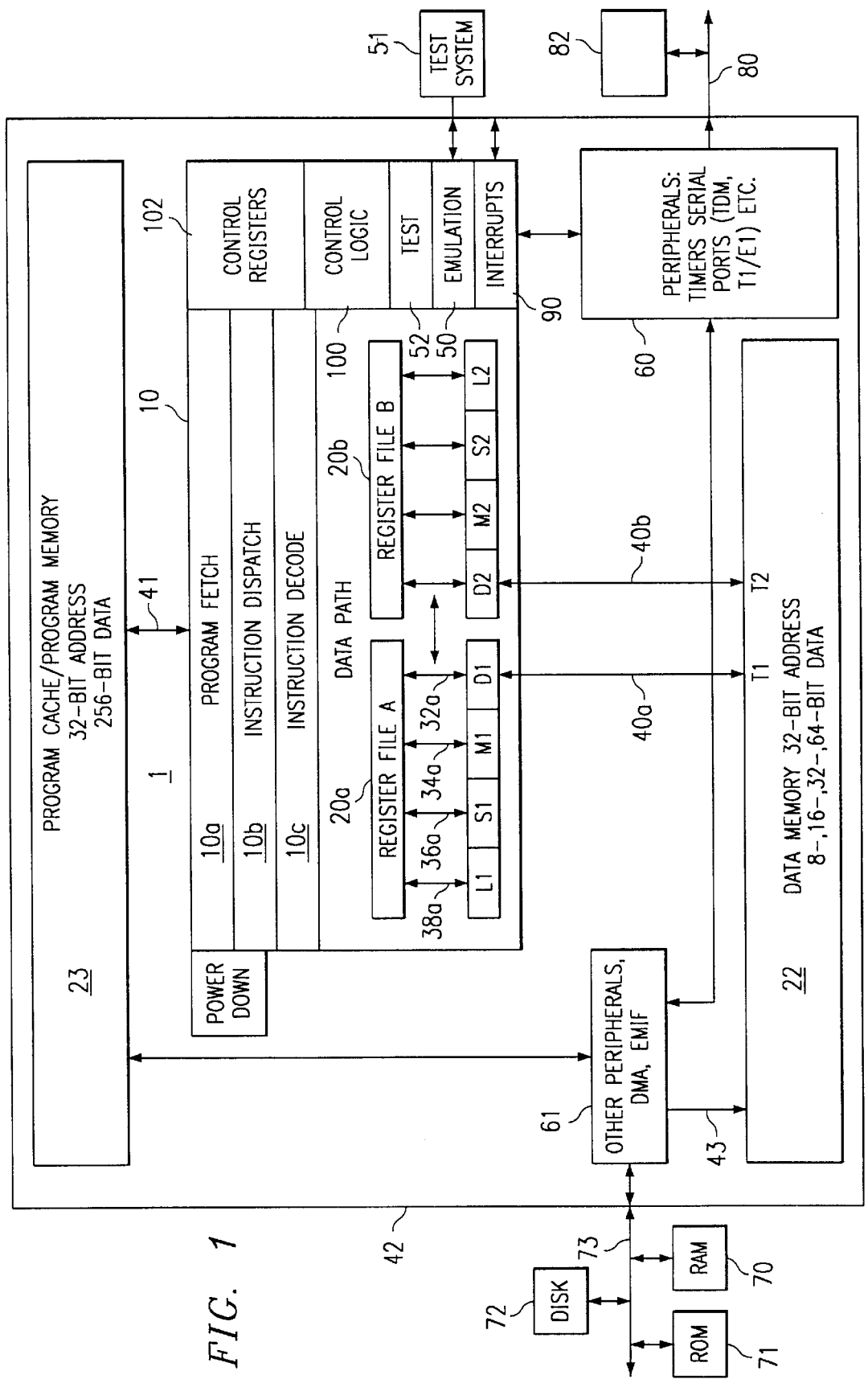
FIG. 1 is a block diagram of a digital signal processor (DSP), showing components thereof pertinent to an embodiment of the present invention.

FIG. 1 is a block diagram of a microprocessor 1 which has an embodiment of the present invention. Microprocessor 1 is a VLIW digital signal processor ("DSP"). In the interest of clarity, FIG. 1 only shows those portions of microprocessor 1 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail and is incorporated herein by reference. U.S. Pat. No. 5,329,471 issued to Gary Swoboda, et al, describes in detail how to test and emulate a DSP and is incorporated herein by reference. Details of portions of microprocessor 1 relevant to an embodiment of the present invention are explained in sufficient detail hereinbelow, so as to enable one of ordinary skill in the microprocessor art to make and use the invention.

In microprocessor 1 there are shown a central processing unit (CPU) 10, data memory 22, program memory 23, peripherals 60 and an external memory interface (EMIF) with a direct memory access (DMA) 61. CPU 10 further has an instruction fetch/decode unit 10a–c, a plurality of execution units, including an arithmetic and load/store unit D1, a multiplier M1, an ALU/shifter unit S1, an arithmetic logic unit ("ALU") L1, a shared multiport register file 20a from which data are read and to which data are written. Instructions are fetched by fetch unit 10a from instruction memory 23 over a set of busses 41. Decoded instructions are provided from the instruction fetch/decode unit 10a–c to the functional units D1, M1, S1, and L1 over various sets of control lines which are not shown. Data are provided to/from the register file 20a from/to to load/store units D1 over a first set of busses 32a, to multiplier M1 over a second set of busses 34a, to ALU/shifter unit S1 over a third set of busses 36a and to ALU L1 over a fourth set of busses 38a. Data are provided to/from the memory 22 from/to the load/store units D1 via a fifth set of busses 40a. Note that the entire data path described above is duplicated with register file 20b and execution units D2, M2, S2, and L2. In this embodiment of the present invention, two unrelated aligned double word (64 bits) load/store transfers can be made in parallel between CPU 10 and data memory 22 on each clock cycle using bus set 40a and bus set 40b.

A single non-aligned double word load/store transfer is performed by scheduling a first .D unit resource and two load/store ports on memory 22. Advantageously, an extraction circuit is connected to the memory subsystem to provide a non-aligned data item extracted from two aligned data items requested by the .D unit. Advantageously, a second .D unit can perform 32-bit logical or arithmetic instructions in addition to the .S and .L units while the address port of the second .D unit is being used to transmit one of two contiguous addresses provided by the first .D unit. Furthermore, a non-aligned access near the end of a circular buffer region in the target memory provides a non-aligned data item that wraps around to the other end of the circular buffer.

Emulation circuitry 50 provides access to the internal operation of integrated circuit 1 that can be controlled by an external test/development system (XDS) 51. External test system 51 is representative of a variety of known test systems for debugging and emulating integrated circuits. One such system is described in U.S. Pat. No. 5,535,331 which is incorporated herein by reference. Test circuitry 52 contains control registers and parallel signature analysis circuitry for testing integrated circuit 1:

Note that the memory 22 and memory 23 are shown in FIG. 1 to be a part of a microprocessor 1 integrated circuit, the extent of which is represented by the box 42. The memories 22–23 could just as well be external to the microprocessor 1 integrated circuit 42, or part of it could reside on the integrated circuit 42 and part of it be external to the integrated circuit 42. These are matters of design choice. Also, the particular selection and number of execution units are a matter of design choice, and are not critical to the invention.

When microprocessor 1 is incorporated in a data processing system, additional memory or peripherals may be connected to microprocessor 1, as illustrated in FIG. 1. For example, Random Access Memory (RAM) 70, a Read Only Memory (ROM) 71 and a Disk 72 are shown connected via an external bus 73. Bus 73 is connected to the External Memory Interface (EMIF) which is part of functional block 61 within microprocessor 1. A Direct Memory Access (DMA) controller is also included within block 61. The DMA controller is generally used to move data between memory and peripherals within microprocessor 1 and memory and peripherals which are external to microprocessor 1.

In the present embodiment, CPU core 10 is encapsulated as a MegaModule, however, other embodiments of the present invention may be in custom designed CPU's or mass market microprocessors, for example.

A detailed description of various architectural features of the microprocessor of FIG. 1 is provided in coassigned application Ser. No. 09/012,813 (TI-25311), now U.S. Pat. No. 6,182,203, and is incorporated herein by reference. A description of enhanced architectural features and an extended instruction set not described herein for CPU 10 is provided in coassigned U.S. patent application Ser. No. 09/703,096 (TI-30302) Microprocessor with Improved Instruction Set Architecture and is incorporated herein by reference.

Figure 2:
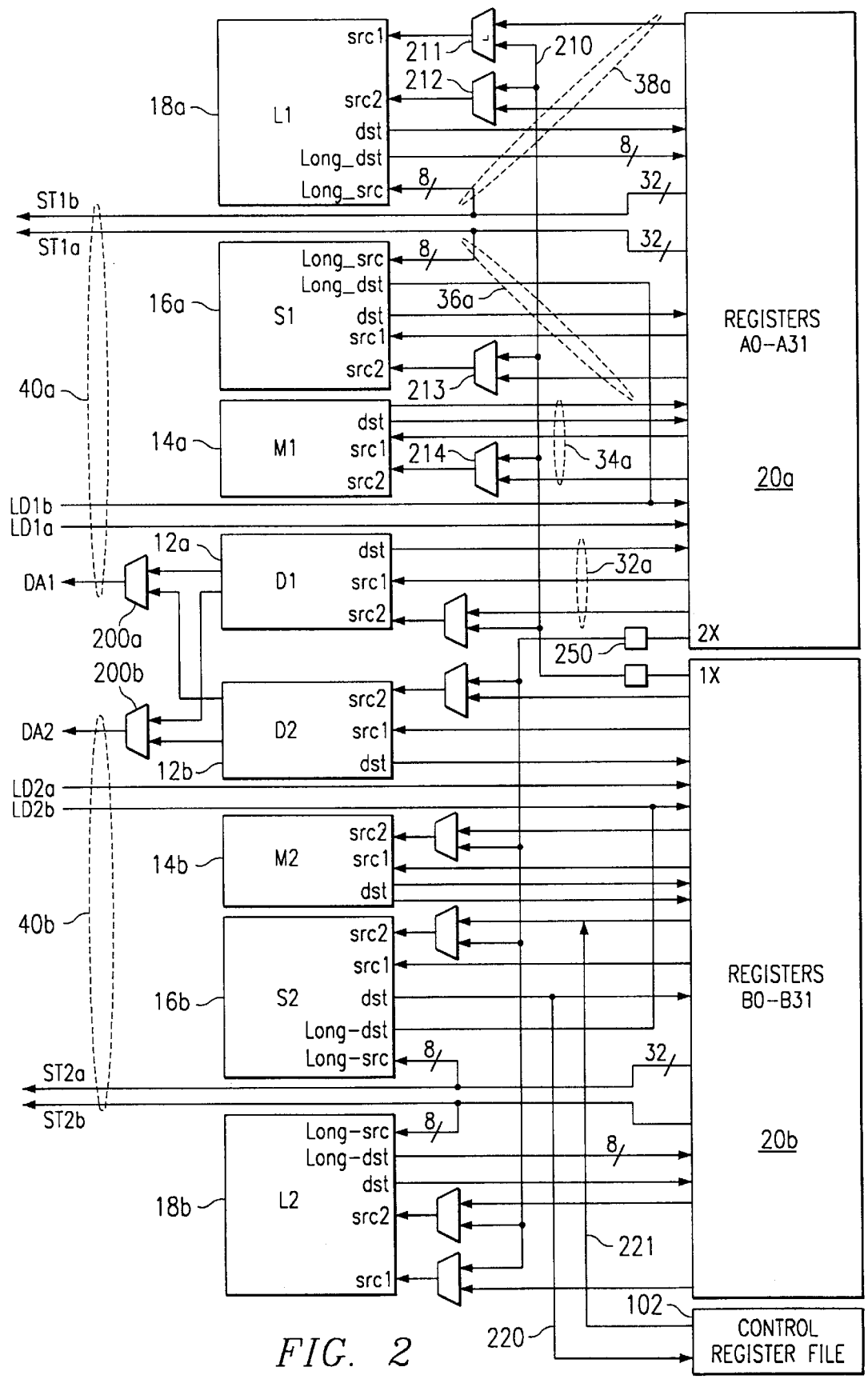
FIG. 2 is a block diagram of the functional units, data paths and register files of FIG. 1.

FIG. 2 is a block diagram of the execution units and register files of the microprocessor of FIG. 1 and shows a more detailed view of the buses connecting the various functional blocks. In this figure, all data busses are 32 bits wide, unless otherwise noted. There are two general-purpose register files (A and B) in the processor's data paths. Each of these files contains 32 32-bit registers (A0–A31 for file A and B0–B31 for file B). The general-purpose registers can be used for data, data address pointers, or condition registers. Any number of reads of a given register can be performed in a given cycle.

The general-purpose register files support data ranging in size from packed 8-bit data through 64-bit fixed-point data. Values larger than 32 bits, such as 40-bit long and 64-bit double word quantities, are stored in register pairs, with the 32 LSBs of data placed in an even-numbered register and the remaining 8 or 32 MSBs in the next upper register (which is always an odd-numbered register). Packed data types store either four 8-bit values or two 16-bit values in a single 32-bit register.

There are 32 valid register pairs for 40-bit and 64-bit data, as shown in Table 1. In assembly language syntax, a colon between the register names denotes the register pairs and the odd numbered register is encoded in the instruction opcode.

TABLE 1

40-Bit/64-Bit Register Pairs
Register Files

| A | B |
|---|---|
| A1:A0 | B1:B0 |
| A3:A2 | B3:B2 |
| A5:A4 | B5:B4 |
| A7:A6 | B7:B6 |
| A9:A8 | B9:B8 |
| A11:A10 | B11:B10 |
| A13:A12 | B13:B12 |
| A15:A14 | B15:B14 |
| A17:A16 | B17:B16 |
| A19:A18 | B19:B18 |
| A21:A20 | B21:B20 |
| A23:A22 | B23:B22 |
| A25:A24 | B25:B24 |
| A27:A26 | B27:B26 |
| A29:A28 | B29:B28 |
| A31:A30 | B31:B30 |

For 40-bit data, operations requiring a long input ignore the 24 MSBs of the odd register. Operations producing a long result zero-fill the 24 MSBs of the odd register. The even register is encoded in the opcode.

The eight functional units in processor 10's data paths are be divided into two groups of four; each functional unit in one data path is almost identical to the corresponding unit in the other data path. The functional units are described in Table 2.

Besides being able to perform 32-bit data manipulations, processor 10 also contains many 8-bit and 16-bit data instructions in the instruction set. For example, the MPYU4 instruction performs four 8x8 unsigned multiplies with a single instruction on a .M unit. The ADD4 instruction performs four 8-bit additions with a single instruction on a .L unit.

TABLE 2

Functional Units and Operations Performed

| Functional Unit | Fixed-Point Operations |
|---|---|
| .L unit (.L1, .L2) | 32/40-bit arithmetic and compare operations<br>32-bit logical operations<br>Leftmost 1 or 0 counting for 32 bits<br>Normalization count for 32 and 40 bits<br>Byte shifts<br>Data packing/unpacking<br>5-bit constant generation<br>Paired 16-bit arithmetic operations<br>Quad 8-bit arithmetic operations<br>Paired 16-bit min/max operations<br>Quad 8-bit min/max operations |
| .S unit (.S1, .S2) | 32-bit arithmetic operations<br>32/40-bit shifts and 32-bit bit-field operations<br>32-bit logical operations<br>Branches<br>Constant generation<br>Register transfers to/from control register file (.S2 only)<br>Byte shifts<br>Data packing/unpacking<br>Paired 16-bit compare operations<br>Quad 8-bit compare operations<br>Paired 16-bit shift operations<br>Paired 16-bit saturated arithmetic operations<br>Quad 8-bit saturated arithmetic operations |
| .M unit (.M1, .M2) | 16 × 16 multiply operations<br>16 × 32 multiply operations<br>Bit expansion<br>Bit interleaving/de-interleaving<br>Quad 8 × 8 multiply operations<br>Paired 16 × 16 multiply operations<br>Paired 16 × 16 multiply with add/subtract operations<br>Quad 8 × 8 multiply with add operations<br>Variable shift operations<br>Rotation<br>Galois Field Multiply |
| D unit (.D1, .D2) | 32-bit add, subtract, linear and circular address calculation<br>Loads and stores with 5-bit constant offset<br>Loads and stores with 15-bit constant offset (.D2 only)<br>Load and store double words with 5-bit constant<br>Load and store non-aligned words and double words<br>5-bit constant generation<br>32-bit logical operations |

Most data lines in the CPU support 32-bit operands, and some support long (40-bit) and double word (64-bit) operands. Each functional unit has its own 32-bit write port into a general-purpose register file (Refer to FIG. 2). All units ending in 1 (for example, .L1) write to register file A 20a and all units ending in 2 write to register file B 20b. Each functional unit has two 32-bit read ports for source operands src1 and src2. Four units (.L1, .L2, .S1, and .S2) have an extra 8-bit-wide port for 40-bit long writes, as well as an 8-bit input for 40-bit long reads. Because each unit has its own 32-bit write port, when performing 32 bit operations all eight units can be used in parallel every cycle. Since each multiplier can return up to a 64-bit result, two write ports are provided from the multipliers to the register file.

Register File Cross Paths

Each functional unit reads directly from and writes directly to the register file within its own data path. That is, the .L1, .S1, .D1, and .M1 units write to register file A and the .L2, .S2, .D2, and .M2 units write to register file B. The register files are connected to the opposite-side register file's functional units via the 1X and 2X cross paths. These cross paths allow functional units from one data path to access a 32-bit operand from the opposite side's register file. The 1X cross path allows data path A's functional units to read their source from register file B. Similarly, the 2X cross path allows data path B's functional units to read their source from register file A.

All eight of the functional units have access to the opposite side's register file via a cross path. The .M1, .M2, .S1, .S2, .D1 and .D2 units' src2 inputs are selectable between the cross path and the same side register file. In the case of the .L1 and .L2 both src1 and src2 inputs are also selectable between the cross path and the same-side register file.

Only two cross paths, 1X and 2X, exist in this embodiment of the architecture. Thus the limit is one source read from each data path's opposite register file per cycle, or a total of two cross-path source reads per cycle. Advantageously, multiple units on a side may read the same cross-path source simultaneously. Thus the cross path operand for one side may be used by any one, multiple or all the functional units on that side in an execute packet. In the C62x/C67x, only one functional unit per data path, per execute packet could get an operand from the opposite register file.

A delay clock cycle is introduced whenever an instruction attempts to read a register via a cross path that was updated in the previous cycle. This is known as a cross path stall. This stall is inserted automatically by the hardware; no NOP instruction is needed. It should be noted that no stall is introduced if the register being read is the destination for data loaded by a LDx instruction.

Memory, Load and Store Paths

Processor 10 supports double word loads and stores. There are four 32-bit paths for loading data for memory to the register file. For side A, LD1a is the load path for the 32 LSBs; LD1b is the load oath for the 32 MSBs. For side B, LD2a is the load path for the 32 LSBs; LD2b is the load path for the 32 MSBs. There are also four 32-bit paths, for storing register values to memory from each register file. ST1a is the write path for the 32 LSBs on side A; ST1b is the write path for the 32 MSBs for side A. For side B, ST2a is the write path for the 32 LSBs; ST2b is the write path for the 32 MSBs.

Some of the ports for long and double word operands are shared between functional units. This places a constraint on which long or double word operations can be scheduled on a datapath in the same execute packet.

Data Address Paths

Bus 40a has an address bus DA1 which is driven by mux 200a. This allows an address generated by either load/store unit D1 or D2 to provide a memory address for loads or stores for register file 20a. Data Bus LD1 loads data from an address in memory 22 specified by address bus DA1 to a register in load unit D1. Unit D1 may manipulate the data provided prior to storing it in register file 20a. Likewise, data bus ST1 stores data from register file 20a to memory 22. Load/store unit D1 performs the following operations: 32-bit add, subtract, linear and circular address calculations. Load/store unit D2 operates similarly to unit D1, with the assistance of mux 200b for selecting an address.

The DA1 and DA2 resources and their associated data paths are specified as T1 and T2 respectively. T1 consists of the DA1 address path and the LD1a, LD1b, ST1a and ST1b data paths. Similarly, T2 consists of the DA2 address path and the LD2a, LD2b, ST2a and ST2b data paths. The T1 and T2 designations; appear in functional unit fields for load and store instructions.

For example, the following load instruction uses the D1 unit to generate the address but is using the LD2a path resource from DA2 to place the data in the B register file. The use of the DA2 resource is indicated with the T2 designation, for example: LDW .D1T2 *A0[3], B1.

Table 3 defines the mapping between instructions and functional units for a set of basic instructions included in a DSP described in U.S. Pat. Ser. No. 09/012,813 (TI-25311, incorporated herein by reference). Table 4 defines a mapping between instructions and functional units for a set of extended instructions in an embodiment of the present invention. Alternative embodiments of the present invention may have different sets of instructions and functional unit mapping. Table 3 and Table 4 are illustrative and are not exhaustive or intended to limit various embodiments of the present invention.

TABLE 3

Instruction to Functional Unit Mapping of Basic Instructions

| .L Unit | .M Unit | .S Unit | .D Unit |
|---|---|---|---|
| ABS | MPY | ADD | ADD |
| ADD | SMPY | ADDK | ADDA |
| AND | | ADD2 | LD mem |
| CMPEQ | | AND | LD mem (15-bit offset) (D2 only) |
| CMPGT | | B disp | MV |
| CMPGTU | | B IRP | NEG |
| CMPLT | | B NRP | ST mem |
| CMPLTU | | B reg | ST mem (15-bit offset) (D2 only) |
| LMBD | | CLR | SUB |
| MV | | EXT | SUBA |
| NEG | | EXTU | ZERO |
| NORM | | MVC | |
| NOT | | MV | |
| OR | | MVK | |
| SADD | | MVKH | |
| SAT | | NEG | |
| SSUB | | NOT | |
| SUB | | OR | |
| SUBC | | SET | |
| XOR | | SHL | |
| ZERO | | SHR | |
| | | SHRU | |
| | | SSHL | |
| | | STP (S2 only) | |
| | | SUB | |
| | | SUB2 | |
| | | XOR | |
| | | ZERO | |

TABLE 4

Instruction to Functional Unit Mapping of Extended Instructions

| .L unit | .M unit | .S unit | .D unit |
|---|---|---|---|
| ABS2 | AVG2 | ADD2 | ADD2 |
| ADD2 | AVGU4 | ADDKPC | AND |
| ADD4 | BITC4 | AND | ANDN |
| AND | BITR | ANDN | LDDW |
| ANDN | DEAL | BDEC | LDNDW |
| MAX2 | DOTP2 | BNOP | LDNW |
| MAXU4 | DOTPN2 | BPOS | MVK |
| MIN2 | DOTPNRSU2 | CMPEQ2 | OR |
| MINU4 | DOTPNRUS2 | CMPEQ4 | STDW |
| | DOTPRSU2 | CMPGT2 | |
| | DOTPRUS2 | CMPGTU4 | |
| MVK | DOTPSU4 | CMPLT2 | STNDW |
| | DOTPUS4 | | |

TABLE 4-continued

Instruction to Functional Unit Mapping of Extended Instructions

| .L unit | .M unit | .S unit | .D unit |
|---|---|---|---|
| OR | DOTPU4 | CMPLTU4 | STNW |
| PACK2 | GMPY4 | MVK | SUB2 |
| PACKH2 | MPY2 | OR | XOR |
| PACKH4 | MPYHI | PACK2 | |
| PACKHL2 | MPYHIR | PACKH2 | |
| | MPYIH | | |
| | MPYIHR | | |
| PACKL4 | MPYIL | PACKHL2 | |
| | MPYILR | | |
| | MPYLI | | |
| PACKLH2 | MPYLIR | PACKLH2 | |
| SHLMB | MPYSU4 | SADD2 | |
| | MPYUS4 | | |
| SHRMB | MPYU4 | SADDU4 | |
| SUB2 | MVD | SADDSU2 | |
| | | SADDUS2 | |
| SUB4 | ROTL | SHLMB | |
| SUBABS4 | SHFL | SHR2 | |
| SWAP2 | SMPY2 | SHRMB | |
| SWAP4 | SSHVL | SHRU2 | |
| UNPKHU4 | SSHVR | SPACK2 | |
| UNPKLU4 | XPND2 | SPACKU4 | |
| XOR | XPND4 | SUB2 | |
| | | SWAP2 | |
| | | UNPKHU4 | |
| | | UNPKLU4 | |
| | | XOR | |

The DSP's opcode map is shown in FIGS. 3A–3J. Refer to Table 14 and the instruction descriptions later herein for explanations of the field syntaxes and values. An instruction syntax is used to describe each instruction. The opcode map breaks down the various bit fields that make up each instruction. There are certain instructions that can be executed on more than one functional unit, as was shown in Table 4. The syntax specifies the functional unit and various resources used by an instruction, typically as follows:

EXAMPLE (.unit) src, dst

The following are examples of what the syntax looks like for the ADD instruction:

1) ADD (.unit) src1, src2, dst
2) ADDU (.unit) src1, src2, dst
3) ADD (.unit) src2, src1, dst
   unit=.L1, .L2, S, .S2, .D1, .D2 src and dst indicate source and destination respectively. The (.unit) dictates which functional unit the instruction is mapped to (.L1, .L2, .S1, .S2, .M1, .M2, .D1, or .D2). This instruction has three opcode map fields: src1, src2, and dst.

The addressing modes for instructions that access memory are linear, circular using BK0, and circular using BK1. The mode is specified by an addressing mode register (AMR) contained in control register file 102. Eight registers can perform circular addressing. A4–A7 are used by the .D1 unit and B4–B7 are used by the .D2 unit. No other units can perform circular addressing modes. For each of these registers, the AMR specifies the addressing mode.

All instructions can be conditional. The condition is controlled by a 3-bit (creg) field specifying a register to be tested, and a 1-bit field (z) specifying a test for zero or nonzero, as shown in FIGS. 3A–3J. The four MSBs of every opcode are creg and z. The specified register is tested at the beginning of the E1 instruction execution pipeline stage for all instructions. The pipeline is described later herein. If z=1, the test is for equality with zero. If z=0, the test is for nonzero. The case of condition register field (creg)=0 and z=0 is treated as always true to allow instructions to be executed unconditionally. The creg register field is encoded as shown in Table 5. Conditional instructions are represented by "[ ]" surrounding the condition register.

TABLE 5

Registers That Can Be Tested by Conditional Operations

| Creg | | | z | |
|---|---|---|---|---|
| 31 | 30 | 29 | 28 | Register Tested |
| 0 | 0 | 0 | 0 | Unconditional |
| 0 | 0 | 0 | 1 | Reserved: When selected this indicates a SWBP instruction |
| 0 | 0 | 1 | z | B0 |
| 0 | 1 | 0 | z | B1 |
| 0 | 1 | 1 | z | B2 |
| 1 | 0 | 0 | z | |
| 1 | 0 | 0 | z | A1 |
| 1 | 0 | 1 | z | A2 |
| 1 | 1 | x | x | Reserved |

Note:
x is don't care for reserved cases.

Instructions are always fetched eight at a time. This constitutes a fetch packet. The execution grouping of the fetch packet is specified by the p-bit, bit zero, of each instruction. Fetch packets are 8-word aligned.

The p bit controls the parallel execution of instructions. The p bits are scanned from left to right (lower to higher address). If the p bit of instruction i is 1, then instruction i+1 is to be executed in parallel with (in the same cycle as) instruction i. If the p-bit of instruction i is 0, then instruction i+1 is executed in the cycle after instruction i. All instructions executing in parallel constitute an execute packet. An execute packet can contain up to eight instructions. All instructions in an execute packet must use a unique functional unit.

Pipeline Operation

The DSP pipeline has several key features which improve performance, decrease cost, and simplify programming. They are: increased pipelining eliminates traditional architectural bottlenecks in program fetch, data access, and multiply operations; control of the pipeline is simplified by eliminating pipeline interlocks; the pipeline can dispatch eight parallel instructions every cycle; parallel instructions proceed simultaneously through the same pipeline phases; sequential instructions proceed with the same relative pipeline phase difference; and load and store addresses appear on the CPU boundary during the same pipeline phase, eliminating read-after-write memory conflicts.

A multi-stage memory pipeline is present for both data accesses and program fetches. This allows use of high-speed synchronous memories both on-chip and off-chip, and allows infinitely nestable zero-overhead looping with branches in parallel with other instructions.

There are no internal interlocks in the execution cycles of the pipeline, so a new execute packet enters execution every CPU cycle. Therefore, the number of CPU cycles for a particular algorithm with particular input data is fixed. If during program execution, there are no memory stalls, the number of CPU cycles equals the number of clock cycles for a program to execute.

Performance can be inhibited by stalls from the memory system, stalls for cross path dependencies, or interrupts. The reasons for memory stalls are determined by the memory architecture. Cross path stalls are described in detail in U.S. Pat. Ser. No. 09/702,453 (TI-30563), to Steiss, et al and is incorporated herein by reference. To fully understand how to optimize a program for speed, the sequence of program fetch, data store, and data load requests the program makes, and how they might stall the CPU should be understood.

The pipeline operation, from a functional point of view, is based on CPU cycles. A CPU cycle is the period during which a particular execute packet is in a particular pipeline stage. CPU cycle boundaries always occur at clock cycle boundaries; however, stalls can cause CPU cycles to extend over multiple clock cycles. To understand the machine state at CPU cycle boundaries, one must be concerned only with the execution phases (E1–E5) of the pipeline. The phases of the pipeline are shown in FIG. 4 and described in Table 6.

TABLE 6

Pipeline Phase Description

| Pipeline | Pipeline Phase | Symbol | During This Phase | Instruction Types Completed |
|---|---|---|---|---|
| Program Fetch | Program Address Generate | PG | Address of the fetch packet is determined. | |
| | Program Address Send | PS | Address of fetch packet is sent to memory. | |
| | Program Wait | PW | Program memory access is performed. | |
| | Program Data Receive | PR | Fetch packet is expected at CPU boundary. | |
| Program Decode | Dispatch | DP | Next execute packet in fetch packet determined and sent to the appropriate functional units to be decoded. | |
| | Decode | DC | Instructions are decoded at functional units. | |
| Execute | Execute 1 | E1 | For all instruction types, conditions for instructions are evaluated and operands read. Load and store instructions: address generation is computed and address modifications written to register file† Branch instructions: affects branch fetch packet in PG phase† Single-cycle instructions: results are written to a register file† | Single-cycle |
| | Execute 2 | E2 | Load instructions: address is sent to memory† Store instructions and STP: address and data are sent to memory† Single-cycle instructions that saturate results set the SAT bit in the Control Status Register (CSR) if saturation occurs.† Multiply instructions: results are written to a register file† | Stores STP Multiplies |
| | Execute 3 | E3 | Data memory accesses are performed. Any multiply instruction that saturates results sets the SAT bit in the Control Status Register (CSR) if saturation occurs.† | |
| | Execute 4 | E4 | Load instructions: data is brought to CPU boundary† | |
| | Execute 5 | E5 | Load instructions: data is loaded into register† | Loads |

†This assumes that the conditions for the instructions are evaluated as true. If the condition is evaluated as false, the instruction will not write any results or have any pipeline operation after E1.

Referring again to FIG. 4 and FIG. 1, the instruction execution pipeline of processor 10 involves a number of discrete stages, generally demarcated by temporary latches or registers to pass the results of one stage to the next. Instruction pipeline phases PG, PS, PW, and PR all involve instruction fetching and are embodied in program fetch circuit 10 in association with program memory subsystem 23. Pipeline phases DP and DC involve instruction decoding; phase DP is embodied in dispatch circuitry 10b, while pipeline phase DC is embodied in decode circuitry 10c. The execution phases E1–E5 are embodied in stages embodied within each functional unit L, S, M and D. For example, the D units embody all five execute stage in association with memory subsystem 22. Other of the functional units do not embody all five execution phase, but only what is required for the instruction types that are executed by a particular functional unit.

The execution of instructions can be defined in terms of delay slots, as shown in Table 7. A delay slot is a CPU cycle that occurs after the first execution phase (E1) of an instruction in which results from the instruction are not available. For example, a multiply instruction has 1 delay slot, this means that there is 1 CPU cycle before another instruction can use the results from the multiply instruction.

TABLE 7

Delay Slot Summary

| Instruction Type | Delay Slots | Execute Stages Used |
|---|---|---|
| Branch (The cycle when the target enters E1) | 5 | E1-branch target E1 |
| Load (LD) (Incoming Data) | 4 | E1–E5 |
| Load (LD) (Address Modification) | 0 | E1 |
| Multiply | 1 | E1–E2 |
| Single-cycle | 0 | E1 |
| Store | 0 | E1 |
| NOP (no execution pipeline operation) | — | — |
| STP (no CPU internal results written) | — | — |

Single cycle instructions execute during the E1 phase of the pipeline. The operand is read, operation is performed and the results are written to a register all during E1. These instructions have no delay slots.

Multiply instructions complete their operations during the E2 phase of the pipeline. In the E1 phase, the operand is read and the multiply begins. In the E2 phase, the multiply finishes, and the result is written to the destination (dst) register. Multiply instructions have 1 delay slot.

Load instructions have two results: data loaded from memory and address pointer modification.

Data loads complete their operations during the E5 phase of the pipeline. In the E1 phase, the address of the data is computed. In the E2 phase, the data address is sent to data memory. In the E3 phase, a memory read is performed. In the E4 stage, the data is received at the CPU core boundary. Finally, in the E5 phase, the data is loaded into a register. Because data is not written to the register until E5, these instructions have 4 delay slots. Because pointer results are written to the register in E1, there are no delay slots associated with the address modification.

Store instructions complete their operations during the E3 phase of the pipeline. In the E1 phase, the address of the data is computed. In the E2 phase, the data address is sent to data memory. In the E3 phase, a memory write is performed. The address modification is performed in the E1 stage of the pipeline. Even though stores finish their execution in the E3 phase of the pipeline, they have no delay slots and follow the following rules (i=cycle):

1) When a load is executed before a store, the old value is loaded and the new value is stored.

2) When a store is executed before a load, the new value is stored and the new value is loaded.

3) When the instructions are in are in parallel, the old value is loaded and the new value is stored.

Bit Mask Instructions

An aspect of the present invention is that the DSP of FIG. 1 includes instructions to expand one bit to form a mask that can be used by other instructions for logical operations. In this embodiment, two such instructions are provided: XPND2 and XPND4.

FIG. 5A illustrates an instruction syntax for the XPND2 instruction, a two way expand instruction.

FIG. 5B illustrates the operation of the XPND2 instruction. The XPND2 instruction reads the two least-significant bits of src2 and expands them into two multi-bit mask fields written to dst. Each multi-bit mask field corresponds to a half word, or sixteen bits. Bit 1 of src2 is replicated and placed in the upper half-word of dst. Bit 0 of src2 is replicated and placed in the lower half-word of dst. Bits 2 through 31 of src2 are ignored.

As with all of the instructions executed by the DSP of FIG. 1, the XPND2 instruction is conditional. Table 8 defines the operation of the XPND2 instruction using pseudo code. Src2 is read during pipeline phase E1, and the expanded mask is written to dst during pipeline phase E2, thus it is categorized as being two cycle, having one delay slot.

TABLE 8

Execution of XPND2 Instruction if (cond) {
   XPND2(src2 & 1) → lsb16(dst);
   XPND2(src2 & 2) → msb16(dst);
}
else nop For example, if src2 contains B174 6CA1h and dst contains XXXX XXXXh before execution, then dst will contain 0000 FFFFh after execution because the two LSBs are 01. As another example, if src2 contains 0000 0003h and dst contains XXXX XXXXh before execution, then dst will contain FFFF FFFFh after execution because the two LSBs are 11.

This instruction is useful when combined with the output of a split compare greater than instruction (CMPGT2) or a split compare equal instruction (CMPEQ2) for generating a mask that corresponds to the individual half-word positions that were compared. That mask may then be used with a bit-wise logical AND with invert instruction (ANDN), bit-wise logical AND (AND) or bit-wise logical OR (OR) instructions, for example, in order to perform complex operations such as compositing.

Table 9 contains an example instruction code sequence that illustrates formation of a two bit operand by a CMPGT2 instruction, followed by mask expansion by an XPAND2 instruction, and then a bit-wise Boolean AND operation.

TABLE 9

Instruction Sequence With XPAND2

| CMPGT2 | .S1 | A3, A4, A5 | compare two registers, A3, A4 to form result bits according to the upper and lower halves, store in A5 |
|---|---|---|---|
| XPND2 | .M1 | A5, A2 | expand the compare results in A5 into two 16-bit masks and store in A2 |
| NOP | | | |
| AND | .D1 | A2, A7, A8 | apply the two masks in A2 to a value in A7 to create bit-wise Boolean result and store in A8 |

Because XPND2 only examines the two least-significant bits of src2, it is possible to store a large bit mask in a single 32-bit word, and expand it using multiple shift right instructions (SHR) and XPND2 pairs. This can be useful for expanding a packed 1-bit per pixel bitmap into full 16-bit pixels in imaging applications, for example.

FIG. 6A illustrates an instruction syntax for the XPND4 instruction, a four way expand instruction.

FIG. 6B illustrates the operation of the XPND4 instruction. The XPND4 instruction reads the four least-significant bits of src2 and expands them into four multi-bit mask fields written to dst. In this case, each multi-bit mask field corresponds to one byte, eight bits. Bit 0 of src2 is replicated and placed in the least significant byte of dst. Bit 1 of src2 is replicated and placed in second least significant byte of dst. Bit 2 of src2 is replicated and placed in second most significant byte of dst. Bit 3 of src2 is replicated and placed in most significant byte of dst. Bits 4 through 31 of src2 are ignored.

As with all of the instructions executed by the DSP of FIG. 1, the XPND4 instruction is conditional. Table 10 defines the operation of the XPND4 instruction using pseudo code. Src2 is read during pipeline phase E1, and the expanded mask is written to dst during pipeline phase E2, thus it is categorized as being two cycle, having one delay slot.

TABLE 10

Execution of XPND4 Instruction if (cond) {
   XPND4(src2 & 1) → byte0(dst);
   XPND4(src2 & 2) → byte1(dst);
   XPND4(src2 & 4) → byte2(dst);
   XPND4(src2 & 8) → byte3(dst);
}
else nop For example, if src2 contains B174 6CA4h and dst contains XXXX XXXXh before execution, then dst will contain 00 FF 00 00h after execution because the four LSBs are 0100. As another example, if src2 contains 0000 000Ah and dst contains XXXX XXXXh before execution, then dst will contain FF 00 FF 00h after execution because the four LSBs are 1010.

This instruction is useful when combined with the output of a split compare greater than instruction (CMPGT4) or a split compare equal instruction (CMPEQ4), for example, for generating a mask that corresponds to the individual byte positions that were compared. That mask may then be used with a bit-wise logical AND with invert instruction (ANDN), bit-wise logical AND (AND) or bit-wise logical OR (OR) instructions, for example, in order to perform complex operations such as compositing.

Table 11 contains an example instruction code sequence that illustrates formation of a four bit operand by a CMPEQ4 instruction, followed by mask expansion by an XPAND4 instruction, and then a bit-wise Boolean AND operation.

TABLE 11

Instruction Sequence with XPAND4

| CMPEG4 | .S1 | A3, A4, A5 | compare two registers, A3, A4 to form result bits according to the respective four bytes, store in A5 |
|---|---|---|---|
| XPND4 | .M1 | A5, A2 | expand the compare results in A5 into four 8-bit masks and store in A2 |
| NOP | | | wait one delay slot |
| AND | .D1 | A2, A7, A8 | apply the four masks in A2 to a value in A7 to create bit-wise Boolean result and store in A8 |

Because XPND4 only examines the four least-significant bits of src2, it is possible to store a large bit mask in a single 32-bit word, and expand it using multiple SHR and XPAND4 pairs. This can be useful for expanding a packed 1-bit per pixel bitmap into full 8-bit pixels in imaging applications, for example.

Figure 7A:
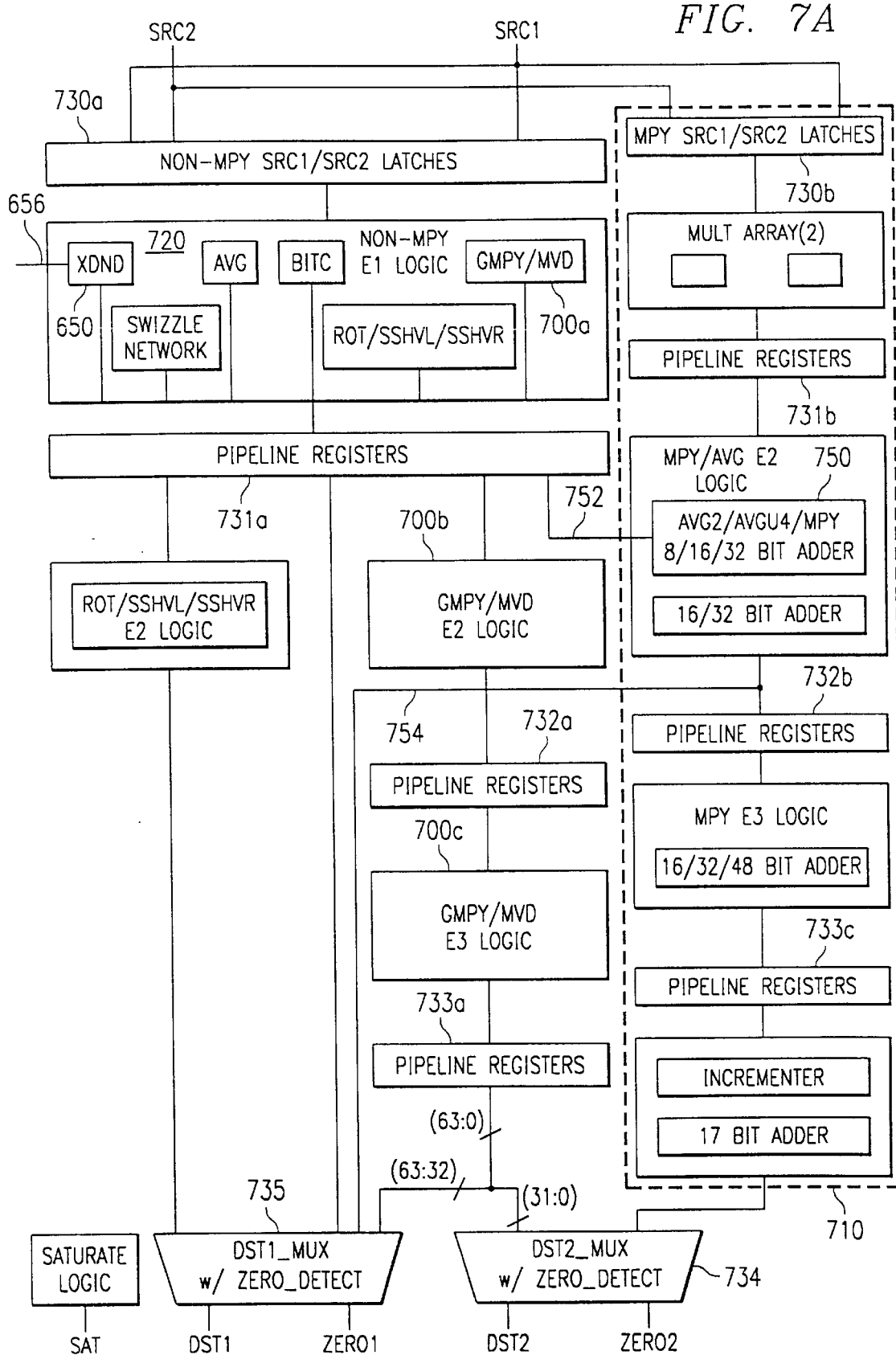
FIG. 7A is a block diagram illustrating an M unit of the DSP with mask circuitry for executing XPND2 and XPND4 instructions.

FIG. 7A is a top level block diagram of .M unit 14a, which is optimized to handle multiplication, although hardware is available for a limited set of add and subtract operations and also for the bit expand instruction of the present invention. The .M unit has three major functional units: Galois multiply unit 700a–c, multiply unit 710 and other non-multiply functional circuitry in block 720. Bit expand circuitry 650 is included within functional circuitry 720. Galois multiplier 700a–c and multiplier 710 require three additional cycles to complete the multiply operations, so multiply instructions are categorized as having three delay slots. Pipeline registers 730–733 hold partial results between each pipeline execution phase. In general, multiply unit 710 can perform the following operations: two 16×16 multiplies or four 8×8 multiplies with all combination of signed or unsigned numbers, Q-shifting and P-shifting of multiply results, rounding for multiply instructions, controlling the carry chain by breaking/joining the carry chain at 16-bit block boundaries, and saturation multiplication where the final result is shifted left by 1 or returns 0×7FFFFFFF if an overflow occurs. Galois multiply unit 700 performs Galois multiply in parallel with M multiply unit 710. The lower 32 bits (bits 31:0) of a result are selected by multiplexer 734 and are stored in the even register of a register pair. The upper 32 bits (bits 63:33) of the result are selected by multiplexer 735 and are stored in the odd register of the register pair. A more detailed description of configurable multiply circuitry is provided in co-assigned U.S. patent application Ser. No. 09/703,093 (TI-26010) entitled Data Processor With Flexible Multiply Unit and is incorporated herein by reference.

Mask circuitry 650 is connected to receive operand data from the src2 input of the M unit via path 652. A source operand is specified by the instruction syntax. Output path 654 allows an expanded mask to be written to a destination register specified by the instruction syntax. Control signals 656 are connected to instruction decode circuitry 10c and control operation of mask circuitry 650 in response to decoding an XPND2 or XPND4 instruction.

Figure 7B:
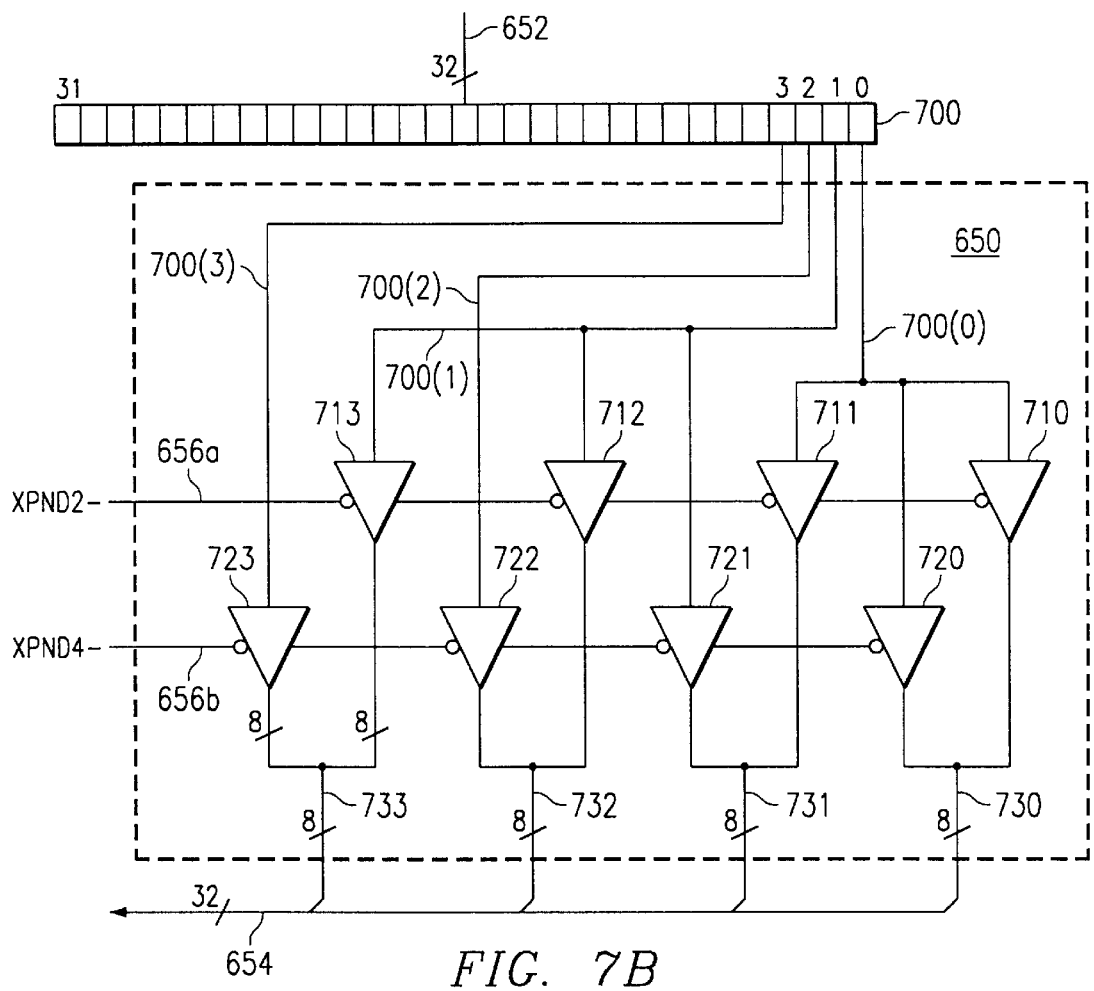
FIG. 7B is a more detailed block diagram of the mask circuitry of FIG. 7A.

FIG. 7B is a more detailed block diagram of the mask circuitry of FIG. 6. Register 700 is a temporary register that stores a value of src2 that is received in the .M unit during execute phase E1. Only the four LSB bits 700(0-3) are provided to mask circuit 650. Destination operand bit lines 730–733 provide an expanded mask to a selected destination register in register file 20a at the end of execute phase E2. Four sets of transfer gates, 710–713, are enabled when a signal XPND2- 656a from instruction decode circuitry 10c is asserted to indicate an XPND2 instruction is being executed. Four sets of transfer gates 720–723 are enabled when a signal XPND4- 656b from instruction decode circuitry 10c is asserted to indicate an XPND4 instruction is being executed.

Each set of transfer gates comprises eight gates associated with each of eight bit lines. For example, transfer gate set 710 is associated with eight LSB bit lines 730, while transfer gate set 723 is associated with eight MSB bit lines 733. Transfer gate sets 710 and 711 expand bit 0 onto LS half word bit lines 730–731. Transfer gate sets 712 and 713 expand bit 1 onto MS half word bit lines 732–733. Transfer gate set. 720 expands bit 0 onto LS byte bit lines 730. Transfer gate set 721 expands bit 1 onto second LS byte bit lines 731. Transfer gate set 722 expands bit 2 onto second MS byte bit lines 732. Transfer gate set 723 expands bit 3 onto MS byte bit lines 733.

One skilled in the art will recognize that mask circuitry 650 may be implemented in a number of different ways, by using various configurations of transfer gates, multiplexors, and such. In another embodiment, the mask circuitry may be implemented such that the expand instructions execute with a different number of delay slots, such as none or two, for example. In another embodiment, a single bit may be expanded to a different number of destination bit lines, such as four for example. There may be only one or more than two varieties of expand instructions. Furthermore, the mask circuitry may be controlled in other manners than the two control signals of the present embodiment. A set of control signals may be encoded to provide state information to control the mask circuitry, for example. In this embodiment of the present invention, mask circuitry is included in the M units of the CPU. However, in another embodiment it, mask circuitry may be included in other or different functional units.

As discussed earlier, the set of extended instructions included in the present embodiment of the invention increases orthogonality of the instruction set, provides data flow enhancements with 8-bit and 16-bit extension, and provides instructions that reduce code size and increase register flexibility. For example, there is an extensive collection of PACK and byte shift instructions to simplify manipulation of packed data types. A set of instructions is provided that operate directly on packed data to streamline data flow and increase instruction set efficiency. These are referred to as single instruction, multiple data (SIMD) instructions. They are summarized in Table 12, and described completely in U.S. patent application Ser. No. 09/703,096 (TI-30302) Microprocessor with Improved Instruction Set Architecture.

Table 13 provides more description of several instructions included in Table 12. The instructions described in Table 13 are an example of instructions that can be used advantageously in conjunction with the expand instructions. Table 14 explains various symbols used herein.

TABLE 12

SIMD Instruction for Operating Directly on Packed Data

| Operation | Quad 8-bit | Paired 16-bit |
| --- | --- | --- |
| Multiply | X | X |
| Multiply with Saturation |  | X |
| Addition/Subtraction | X | X |
| Addition with Saturation | X | X |
| Absolute Value |  | X |
| Subtract with Absolute Value | X |  |
| Compare | X | X |
| Shift |  | X |
| Data Pack/Unpack | X | X |
| Data Pack with Saturation | X | X |
| Dot product with optional negate | X | X |
| Min/Max/Average | X | X |
| Bit-expansion (Mask generation) | X | X |

TABLE 13

Detailed Description of selected SIMD instructions from Table 12

| | |
| --- | --- |
| CMPEQ2 | Compare if Equal, Packed 16-bit: The CMPEQ2 instruction performs equality comparisons on packed 16-bit data. Each 16-bit value in src1 is compared against the corresponding 16-bit value in src2, returning a 1 if equal or 0 if not equal. The equality results are packed into the two least-significant bits of dst. The result for the lower pair of values is placed in bit 0, and the results for the upper pair of values are placed in bit 1. The remaining bits of dst are set to 0. |
| CMPEQ4 | Compare if Equal, Packed 8-bit: The CMPEQ4 instruction performs equality comparisons on packed 8-bit data. Each 8-bit value in src1 is compared against the corresponding 8-bit value in src2, returning a 1 if equal or 0 if not equal. The equality results are packed into the four least-significant bits of dst. The 8-bit values in each input are numbered from 0 to 3 starting with the least-significant byte, working towards the most-significant byte. The comparison results for byte 0 are written to bit 0 of the result. Likewise, the results for byte 1 to 3 are written to bits 1 to 3 of the result, respectively, as shown in the diagram below. The remaining bits of dst are set to 0. |
| CMPGT2 | Compare for Greater Than, Packed 16-bit: The CMPGT2 instruction performs greater than comparisons on signed packed 16-bit data. Each signed 16-bit value in src1 is compared against the corresponding signed 16-bit value in src2, returning a 1 if src1 is greater than src2 or returning a 0 if it is not greater. The comparison results are packed into the two least-significant bits of dst. The result for the lower pair of values is placed in bit 0, and the results for the upper pair of values are placed in bit 1. The remaining bits of dst are set to 0. |
| CMPGTU4 | Compare for Greater Than, Unsigned Packed 8-bit: The CMPGTU4 instruction performs greater than comparisons on packed 8-bit data. Each unsigned 8-bit value in src1 is compared against the corresponding 8-bit unsigned value in src2, returning a 1 if the byte in src1 is greater than the corresponding byte in src2 or 0 if is not greater than. The comparison results are packed into the four least-significant bits of dst. The 8-bit values in each input are numbered from 0 to 3 starting with the least-significant byte, working towards the most-significant byte. The comparison results for byte 0 are written to bit 0 of the result. Likewise, the results for byte 1 to 3 are written to bits 1 to 3 of the result, respectively, as shown in the diagram below. The remaining bits of dst are set to 0. |
| CMPLT2 | Compare for Less Than, Packed 16-bit (Pseudo-Operation): CMPLT2 is a pseudo-operation used to perform less than comparisons on signed packed 16-bit data. Each signed 16-bit value in src2 is compared against the corresponding signed 16-bit value in src1, returning a 1 if src2 is less than src1 or returning a 0 if it is not less than. The comparison results are packed into the two least-significant bits of dst. The result for the lower pair of values is placed in bit 0, and the results for the upper pair of values are placed in bit 1. The remaining bits of dst are set to 0. The assembler uses the operation CMPGT2 (.unit) src1, src2, dst to perform this task. |
| CMPLTU4 | Compare for Less Than, Unsigned Packed 8-bit (Pseudo-Operation): CMPLTU4 is a pseudo-operation that performs less than comparisons on packed 8-bit data. Each unsigned 8-bit value in src2 is compared against the corresponding 8-bit unsigned value in src1, returning a 1 if the byte in src2 is less than the corresponding byte in src1 or 0 if is not less than. The comparison results are packed into the four least-significant bits of dst. The 8-bit values in each input are numbered from 0 to 3 starting with the least-significant byte, working towards the most-significant byte. The comparison results for byte 0 are written to bit 0 of the result. Likewise, the results for byte 1 to 3 are written to bits 1 to 3 of the result, respectively, as shown in the diagram below. The remaining bits of dst are set to 0. |
| ANDN | Bit-Wise Logical AND Invert: In the ANDN instruction, a bit-wise logical AND is performed between src1 and the bit-wise logical inverse of src2. The result is placed in dst. |
| AND | A bit-wise AND is performed between src1 and src2. The result is placed in dst. The scst5 operands are sign extended to 32 bits. |
| OR | A bit-wise OR is performed between src1 and src2. The result is placed in dst. The scst5 operands are sign extended to 32 bits. |
| XOR | A bit-wise XOR is performed between src1 and src2. The result is placed in dst. The scst5 operands are sign extended to 32 bits. |

TABLE 14

Instruction Operation and Execution Notations

| Symbol | Meaning |
| --- | --- |
| long | 40-bit register value |
| +a | Perform twos-complement addition using the addressing mode defined by the AMR |
| −a | Perform twos-complement subtraction using the addressing mode defined by the AMR |
| xor | Bit-wise exclusive OR |
| not | Bit-wise logical complement |
| $b_{y...z}$ | Selection of bits y through z of bit string b |
| >>s | Shift right with sign extension |
| >>z | Shift right with a zero fill |
| x clear b,e | Clear a field in x, specified by b (beginning bit) and e (ending bit) |
| x exts l,r | Extract and sign-extend a field in x, specified by 1 (shift left value) and r (shift right value) |
| x extu l,r | Extract an unsigned field in x, specified by 1 (shift left value) and r (shift right value) |
| +s | Perform twos-complement addition and saturate the result to the result size, if an overflow or underflow occurs |
| −s | Perform twos-complement subtraction and saturate the result to the result size, if an overflow or underflow occurs |
| x set b,e | Set field in x, to all 1s specified by b (beginning bit) and e (ending bit) |
| lmb0(x) | Leftmost 0 bit search of x |
| lmb1(x) | Leftmost 1 bit search of x |
| norm(x) | Leftmost non-redundant sign bit of x |
| Symbol | Meaning |
| abs(x) | Absolute value of x |
| and | Bit-wise AND |
| bi | Select bit i of source/destination b |
| bit_count | Count the number of bits that are 1 in a specified byte |
| bit_reverse | Reverse the order of bits in a 32-bit register |
| byte0 | 8-bit value in the least significant byte position in 32-bit register (bits 0–7) |
| byte1 | 8-bit value in the next to least significant byte position in 32-bit register (bits 8–15) |

TABLE 14-continued

Instruction Operation and Execution Notations

| Symbol | Meaning |
|---|---|
| byte2 | 8-bit value in the next to most significant byte position in 32-bit register (bits 16–23) |
| byte3 | 8-bit value in the most significant byte position in 32-bit register (bits 24–31) |
| bv2 | Bit Vector of two flags for s2 or u2 data type |
| bv4 | Bit Vector of four flags for s4 or u4 data type |
| cond | Check for either creg equal to 0 or creg not equal to 0 |
| creg | 3-bit field specifying a conditional register |
| cstn | n-bit constant field (for example, cst5) |
| dst_h or dst_o | msb32 of dst (placed in odd register of 64-bit register pair) |
| dst_l or dst_e | lsb32 of dst (place in even register of a 64-bit register pair) |
| dws4 | Four packed signed 16-bit integers in a 64-bit register pair |
| dwu4 | Four packed unsigned 16-bit integers in a 64-bit register pair |
| gmpy | Galois Field Multiply |
| i2 | Two packed 16-bit integers in a single 32-bit register |
| i4 | Four packed 8-bit integers in a single 32-bit register |
| int | 32-bit integer value |
| lsbn or LSBn | n least significant bits (for example, lsb16) |
| msbn or MSBn | n most significant bits (for example, msb16) |
| nop | No operation |
| or | Bit-wise OR |
| R | Any general-purpose register |
| rotl | Rotate left |
| sat | Saturate |
| sbyte0 | Signed 8-bit value in the least significant byte position in 32-bit register (bits 0–7) |
| sbyte1 | Signed 8-bit value in the next to least significant byte position in 32-bit register (bits 8–15) |
| sbyte2 | Signed 8-bit value in the next to most significant byte position in 32-bit register (bits 16–23) |
| sbyte3 | Signed 8-bit value in the most significant byte position in 32-bit register (bits 24–31) |
| scstn | Signed n-bit constant field (for example, scst7) |
| se | Sign-extend |
| sint | Signed 32-bit integer value |
| slsb16 | Signed 16-bit integer value in lower half of 32-bit register |
| smsb16 | Signed 16-bit integer value in upper half of 32-bit register |
| s2 | Two packed signed 16-bit integers in a single 32-bit register |
| s4 | Four packed signed 8-bit integers in a single 32-bit register |
| sllong | Signed 64-bit integer value |
| ubyte0 | Unsigned 8-bit value in the least significant byte position in 32-bit register (bits 0–7) |
| ubyte1 | Unsigned 8-bit value in the next to least significant byte position in 32-bit register (bits 8–15) |
| ubyte2 | Unsigned 8-bit value in the next to most significant byte position in 32-bit register (bits 16–23) |
| ubyte3 | Unsigned 8-bit value in the most significant byte position in 32-bit register (bits 24–31) |
| ucstn | n-bit unsigned constant field (for example, ucst5) |
| uint | Unsigned 32-bit integer value |
| ullong | Unsigned 64-bit integer value |
| ulsb16 | Unsigned 16-bit integer value in lower half of 32-bit register |
| umsb16 | Unsigned 16-bit integer value in upper half of 32-bit register |
| u2 | Two packed unsigned 16-bit integers in a single 32-bit register |
| u4 | Four packed unsigned 8-bit integers in a single 32-bit register |
| xi2 | Two packed 16-bit integers in a single 32-bit register that can optionally use cross path |
| xi4 | Four packed 8-bit integers in a single 32-bit register that can optionally use cross path |
| xsint | Signed 32-bit integer value that can optionally use cross path |

TABLE 14-continued

Instruction Operation and Execution Notations

| Symbol | Meaning |
|---|---|
| xs2 | Two packed signed 16-bit integers in a single 32-bit register that can optionally use cross path |
| xs4 | Four packed signed 8-bit integers in a single 32-bit register that can optionally use cross path |
| xuint | Unsigned 32-bit integer value that can optionally use cross path |
| xu2 | Two packed unsigned 16-bit integers in a single 32-bit register that can optionally use cross path |
| xu4 | Four packed unsigned 8-bit integers in a single 32-bit register that can optionally use cross path |
| → | Assignment |
| + | Addition |
| ++ | Increment by one |
| × | Multiplication |
| − | Subtraction |
| > | Greater than |
| < | Less than |
| << | Shift left |
| >> | Shift right |
| >= | Greater than or equal to |
| <= | Less than or equal to |
| == | Equal to |
| ~ | Logical Inverse |
| & | Logical And |

Figure 8:
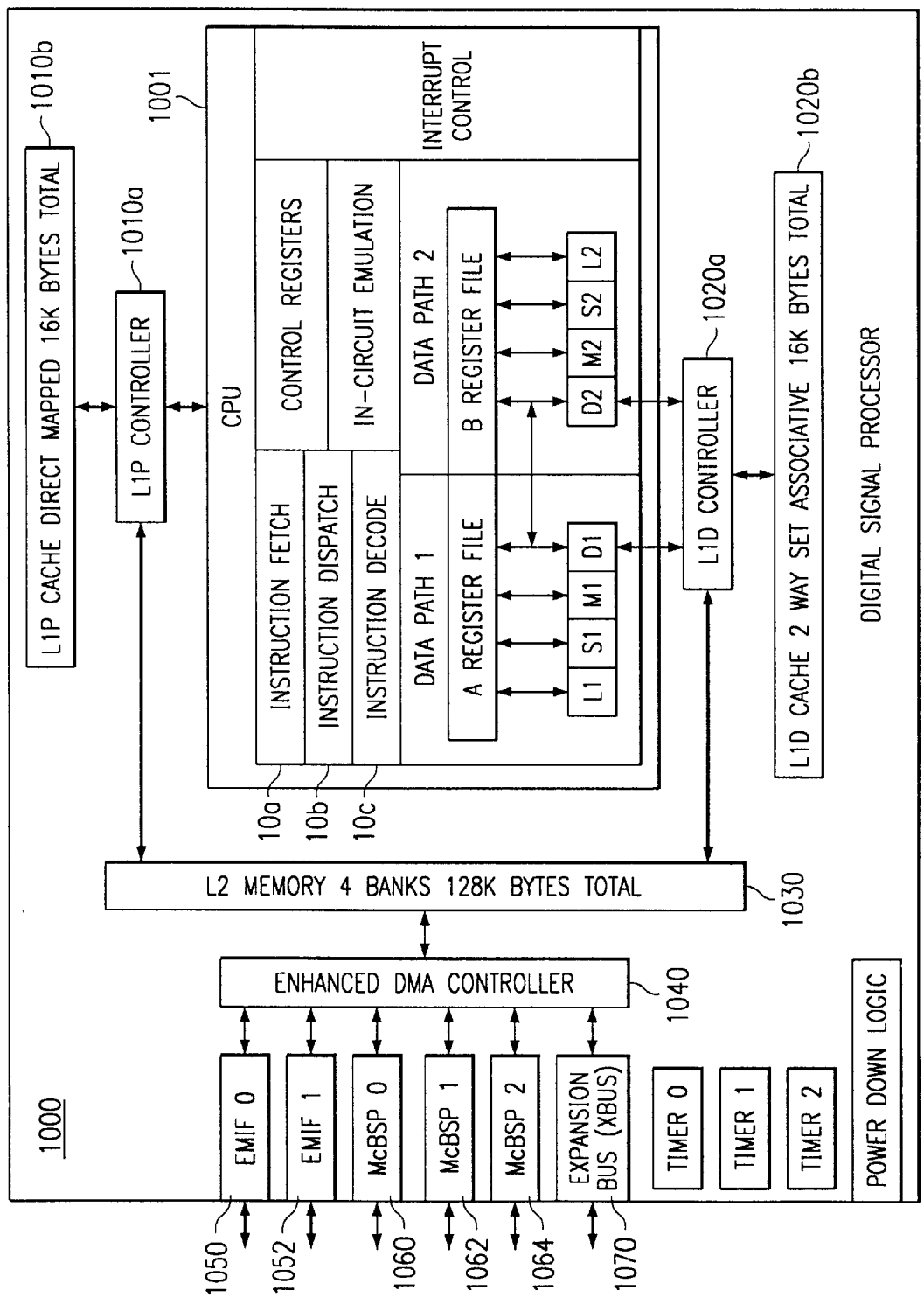
FIG. 8 is a block diagram of an alternative embodiment of the processor of FIG. 1.

FIG. 8 is a block diagram of an alternative embodiment of the present invention in a digital system 1000 with processor core 10 of FIG. 1. A direct mapped program cache 1010, having 16 kbytes capacity, is controlled by L1 Program (L1P) controller 1011 and connected thereby to the instruction fetch stage 10*a*. A 2-way set associative data cache, having a 16 Kbyte capacity, is controlled by L1 Data (L1D) controller 1721 and connected thereby to data units D1 and D2. An L2 memory 1030 having four banks of memory, 128 Kbytes total, is connected to L1P 1011 and to L1D 1021 to provide storage for data and programs. External memory interface (EMIF) 1050 provides a 64 bit data path to external memory, not shown, which provides memory data to L2 memory 1030 via extended direct memory access (DMA) controller 1040.

EMIF 1052 provides a 16-bit interface for access to external peripherals, not shown. Expansion bus 1070 provides host and I/O support similarly to host port 60/80 of FIG. 1.

Three multi-channel buffered serial ports (McBSP) 1060, 1062, 1064 are connected to DMA controller 1040. A detailed description of a McBSP is provided in U.S. Pat. Ser. No. 09/055,011 (TI-26204, Seshan, et al) and is incorporated herein reference.

Figure 9:
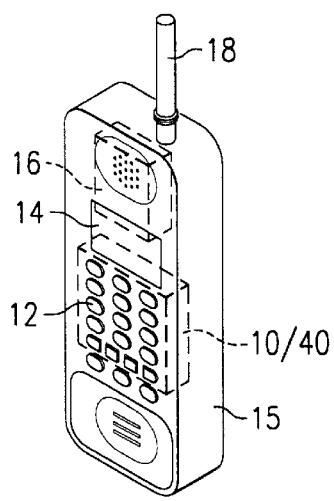
FIG. 9 illustrates an exemplary implementation of a digital system that includes an embodiment of the present invention in a mobile telecommunications device.

FIG. 9 illustrates an exemplary implementation of a digital system that includes DSP 1 packaged in an integrated circuit 40 in a mobile telecommunications device, such as a wireless telephone 15. Wireless telephone 15 has integrated keyboard 12 and display 14. As shown in FIG. 9, DSP 1 is connected to the keyboard 12, where appropriate via a keyboard adapter (not shown), to the display 14, where appropriate via a display adapter (not shown) and to radio frequency (RF) circuitry 16. The RF circuitry 16 is connected to an aerial 18. Advantageously, by providing bit mask expansion instructions in concert with SIMD instructions for forming bit masks and operating on packed data, complex signal processing algorithms can be written in a more efficient manner to satisfy the demand for enhanced wireless telephony functionality.

Fabrication of digital system 10 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

Thus, a digital system is provided with a processor having an improved instruction set architecture. The processor is code-compatible with C62xx DSP processors from Texas Instruments Incorporated. It provides a superset of the C62x architecture while providing complete code compatibility for existing C62x code. The processor provides extensions to the existing C62x architecture in several areas: register file enhancements, data path extensions, additional functional unit hardware, increased orthogonality of the instruction set, data flow enhancements, 8-bit and 16-bit extensions, and additional instructions that reduce code size and increase register flexibility.

Advantageously, an extensive collection of PACK and byte shift instructions simplifies manipulation of packed data types. Single Instruction, Multiple Data (SIMD) instructions have been added that operate directly on packed data to streamline data flow and increase instruction set efficiency. The processor has a comprehensive collection of 8-bit and 16-bit instruction set extensions.

Advantageously, bit expansion instructions, XPND2, XPND4 are provided to form a set of masks, each from a single bit. These single bits can be provided by multiple data compare instructions such as CMPGT2 or CMPGT4 executed by the processor. The set of masks can then be used by other SIMD instructions within the processor.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

While the invention has been described with reference to illustrative embodiments, this description is not intended to be construed in a limiting sense. Various other embodiments of the invention will be apparent to persons skilled in the art upon reference to this description. For example, instead of one or more specific bit mask instructions, a generic bit mask instruction may read a first source operand to determine a number of bits to select from a second source operand. Alternatively, a constant provided by an assembler/compiler may be included within a generic bit mask instruction to specify the number of bits from a source operand to expand. In another embodiment, the source operand may be provided in response to a memory fetch instead of being read from the register file. Likewise, the expanded mask may be written to a destination in memory instead of the register file.

It is therefore contemplated that the appended claims will cover any such modifications of the embodiments as fall within the true scope and spirit of the invention.

What is claimed is:

1. A digital system comprising a microprocessor having an instruction execution pipeline with a plurality of pipeline phases, wherein the microprocessor comprises:

program fetch circuitry operable to perform a first portion of the plurality of pipeline phases;

instruction decode circuitry connected to receive fetched instructions form the program fetch circuitry, the instruction decode circuitry operable to perform a second portion of the plurality of pipeline phases; and at least a first functional unit connected to receive a plurality of control signals from the instruction decode circuitry, the functional unit operable to perform a third portion of the plurality of pipeline phases, the third portion being execution phases, wherein the first functional unit comprises mask circuitry responsive to the plurality of control signals, the mask circuitry operable to select a first operand bit from a source operand and to selectively connect the first bit to a first plurality of destination operand bit lines, such the first operand bit is expanded to form a mask in a selected portion of the destination operand, wherein the mask circuitry is connected to select a plurality of source operand bits from the source operand and to selectively connect each selected source operand bit to selected sets of destination operand lines, such that each selected source operand bit is selectively connected to a different set of destination operand lines.

2. The digital system of claim 1, wherein a first control signal of the plurality of control signals selects a first number of source operand bits to be expanded to a corresponding number of sets of destination operand lines.

3. The digital system of claim 2, wherein a second control signal of the plurality of control signals selects a second number of source operand bits to be expanded to a corresponding number of sets of destination operand lines.

4. The digital system of claim 3, wherein:

the first control signal is operable to select two source operand bits and a first one of the selected source operand bits is expanded to a most significant half word of the destination operand lines and a second one of the selected source operand bits is expanded to a least significant half word of the destination operand lines; and the second control line is operable to select four source operand bits and a first one of the four selected source operand bits is expanded to a most significant byte of the destination operand lines, a second one of the four selected source operand bits is expanded to a second most significant byte of the destination operand lines, a third one of the four selected source operand bits is expanded to a second least significant byte of the destination operand lines, and a fourth one of the four selected source operand bits is expanded to a least significant byte of the destination operand lines.

5. The digital system of claim 4, wherein the first control signal is asserted in response to the instruction decode circuitry decoding a first bit mask instruction and the second control signal is asserted in response to the instruction decode circuitry decoding a second bit mask instruction.

6. The digital system of claim 5, wherein the first bit mask instruction has a first opcode and the second bit mask instruction has a different opcode.

7. The digital system of claim 1, wherein the mask circuitry is operable to select the first operand bit from a source operand and to selectively connect the first bit to the first plurality of destination operand bit lines in a single execution phase of the instruction execution pipeline.

8. The digital system of claim 1 being a cellular telephone, further comprising:
an integrated keyboard connected to the CPU via a keyboard adapter;
a display, connected to the CPU via a display adapter;
radio frequency (RF) circuitry connected to the CPU; and
an aerial connected to the RF circuitry.

9. A method of operating a digital system having a microprocessor with a bit mask instruction, comprising the steps of:
fetching a bit mask instruction for execution;
decoding the bit mask instruction to determine a number of source bits to select;
selecting the number of source bits from a source operand, wherein the selected number of source bits represent a bit mask, wherein a first number of source bits is selected for a first bit mask instruction, and a different second number of source bits is selecedt for a second bit mask instruction;
expanding each of the selected number of source bits to form a corresponding set of multi-bit mask fields; and
storing the set of multi-bit mask fields in a destination operand.

10. The method of claim 9, wherein the step of expanding forms a first set of multi-bit mask fields of a first size for the first mask instruction and forms a second set of multi-bit mask fields of a second different size for the second mask instruction.

11. The method of claim 10, wherein the first set of multibit mask fields comprise two half-word mask fields, and wherein the second set of multibit mask fields comprise four byte mask fields.

12. The method of claim 9, further comprising the steps of:
forming the bit mask by executing a split comparison instruction, such that a first bit of the bit mask is responsive to a comparison of a first portion of a first data item and a second bit of the bit mask is responsive to a comparison of a second portion of the first data item; and
storing the bit mask so formed in the source operand.

13. The method of claim 12, further comprising the step of performing a bit-wise Boolean operation using the set of multi-bit mask fields and a second data item.

14. A method of operating a digital system having a microprocessor with a bit mask instruction, comprising the steps of:
storing a packed 1-bit per pixel bitmap in a source operand, wherein the source operand has a first number of bits;
expanding selected bits of the 1-bit per pixel bitmap to form a corresponding set of multi-bit pixels;
shifting the source operand; and
repeating the steps of expanding and shifting for until the first number of bits has been expanded;
wherein the step of expanding comprises the steps of:
fetching a bit mask instruction for execution;
decoding the bit mask instruction to determine a first number of source bits to select;
selecting the first number of source bits from a predetermined position in source operand, wherein the selected number of source bits represent pixels;
expanding each of the selected source bits to form a corresponding set of multi-bit pixels; and
storing the set of multi-bit pixels in a destination operand.

* * * * *